(12) United States Patent
Fujii

(10) Patent No.: US 12,545,518 B2
(45) Date of Patent: Feb. 10, 2026

(54) PRODUCTION SYSTEM

(71) Applicant: FUJI CORPORATION, Chiryu (JP)

(72) Inventor: Shinichi Fujii, Nagoya (JP)

(73) Assignee: FUJI CORPORATION, Chiryu (JP)

(*) Notice: Subject to any disclaimer, the term of this patent is extended or adjusted under 35 U.S.C. 154(b) by 461 days.

(21) Appl. No.: 18/252,807

(22) PCT Filed: Dec. 1, 2020

(86) PCT No.: PCT/JP2020/044744
§ 371 (c)(1),
(2) Date: May 12, 2023

(87) PCT Pub. No.: WO2022/118380
PCT Pub. Date: Jun. 9, 2022

(65) Prior Publication Data
US 2023/0415998 A1    Dec. 28, 2023

(51) Int. Cl.
*B65G 1/137* (2006.01)

(52) U.S. Cl.
CPC .................. *B65G 1/1375* (2013.01)

(58) Field of Classification Search
CPC .................................................. B65G 1/1375
See application file for complete search history.

(56) References Cited

U.S. PATENT DOCUMENTS

| 9,102,062 | B2* | 8/2015 | Lee | B25J 9/1666 |
| 10,820,459 | B2* | 10/2020 | Kondo | H05K 13/08 |
| 12,358,140 | B2* | 7/2025 | Murray | B25J 9/1666 |
| 2016/0112694 | A1* | 4/2016 | Nishi | G06T 7/74 348/47 |
| 2018/0242485 | A1* | 8/2018 | Kondo | H05K 13/0473 |
| 2020/0198148 | A1* | 6/2020 | Ueno | B25J 9/1697 |

FOREIGN PATENT DOCUMENTS

WO    WO 2017/033268 A1    3/2017

OTHER PUBLICATIONS

International Search Report issued Jan. 26, 2021 in PCT/JP2020/044744 filed on Dec. 1, 2020, 2 pages.

* cited by examiner

*Primary Examiner* — Kyle O Logan
(74) *Attorney, Agent, or Firm* — Oblon, McClelland, Maier & Neustadt, L.L.P.

(57) ABSTRACT

A production system includes a loader configured to perform a first work with respect to a predetermined production device, and a control section configured to limit movement of the loader to a first range set in advance when performing a second work on the predetermined production device by a self-propelled work robot, and configured to limit the movement of the loader to a second range set wider than the first range in a case where the loader completes the first work which can be performed by the movement in the first range during performing the second work by the work robot.

11 Claims, 5 Drawing Sheets

PRODUCTION SYSTEM

TECHNICAL FIELD

The present disclosure relates to a production system.

BACKGROUND ART

The production system is applied to a production line for producing a board product. Patent Literature 1 discloses that a configuration in which a loader and a self-propelled work robot perform respective works on a production device constituting a production line. In the above-described loader, in a case where an intruding object is detected by an area sensor in a detection range around the host device, the movement is stopped or the movement is regulated to prevent interference with the intruding object. Therefore, in Patent Literature 1, in a case where an obstacle is present in a movable range of the loader, a configuration in which the work in a range that does not interfere with the obstacle is preferentially performed is adopted.

PATENT LITERATURE

Patent Literature 1: International Publication WO 2017/033268

BRIEF SUMMARY

Technical Problem

In a production line to which such a loader or a work robot is applied, there is a demand for improving productivity through cooperation of respective devices that assist the production of the board product.

It is an object of the present specification to provide a production system capable of improving efficiency of a loader by appropriately changing a range for limiting movement of the loader, and improving productivity in production line.

Solution to Problem

The present specification discloses a production system including a loader provided to be movable along a conveyance direction of a board with respect to multiple production devices constituting a production line of a board product, and configured to perform a first work with respect to a predetermined production device, and a control section configured to limit movement of the loader to a first range set in advance when performing a second work on the predetermined production device by a self-propelled work robot, and configured to limit the movement of the loader to a second range set wider than the first range in a case where the loader has ended the first work which can be performed by the movement in the first range during performing the second work by the work robot.

Advantageous Effects

With such a configuration, in a case where the self-propelled work robot performs the work in the movable range of the loader, the range for limiting the movement of the loader is changed in a stepwise manner. Accordingly, a range within which the loader can work is extended in the movable range of the loader, so that the efficiency of the loader is improved. As a result, productivity in the production line can be improved.

DESCRIPTION OF EMBODIMENTS

1. Outline of Production System 1

Figure 1:
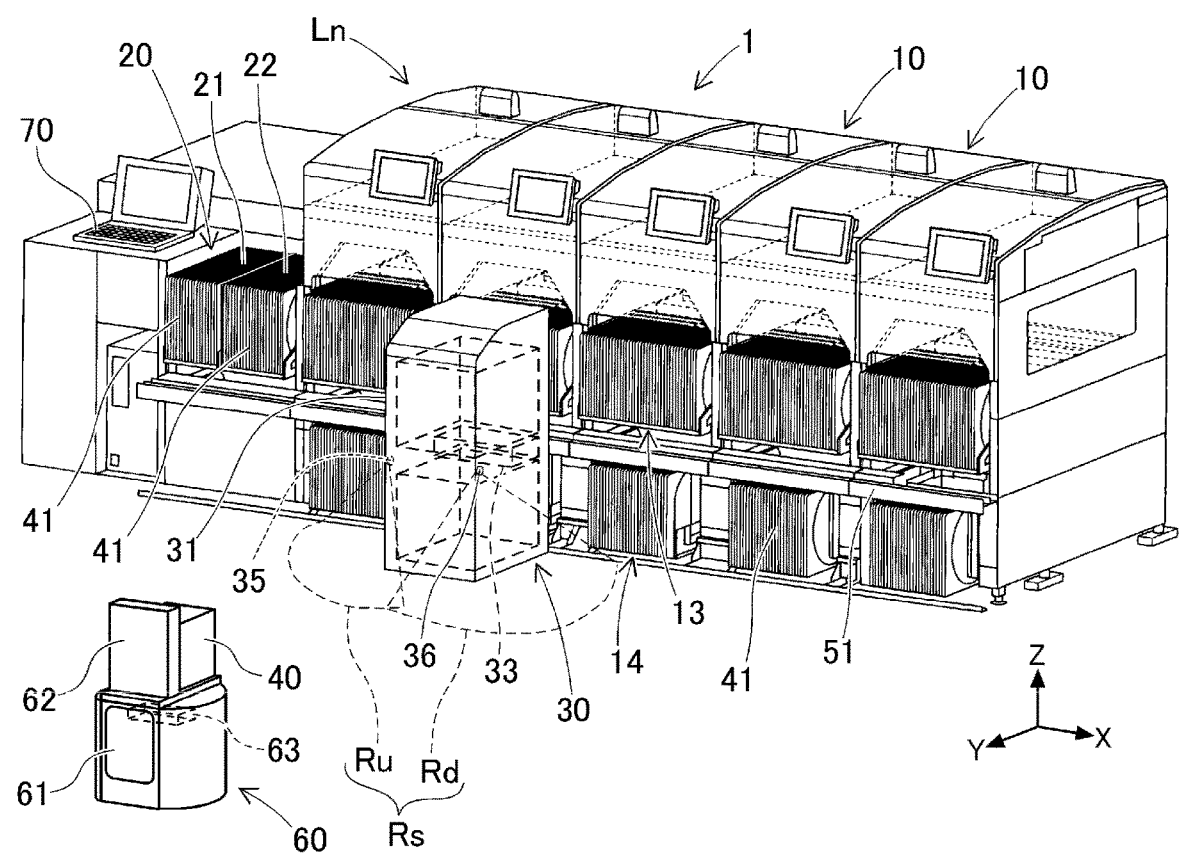
FIG. 1 is a perspective view illustrating a production system in an embodiment.

Hereinafter, particular embodiments of production system 1 will be described with reference to the drawings. Production system 1 is applied to production line Ln for producing a board product. In the present embodiment, as illustrated in FIG. 1, production system 1 includes production line Ln, loader 30, and management device 70. Management device 70 is configured to communicate with multiple production devices constituting production line Ln, loader 30, and self-propelled work robot 60 described later via a network.

2. Configuration of Production Line Ln

Figure 3:
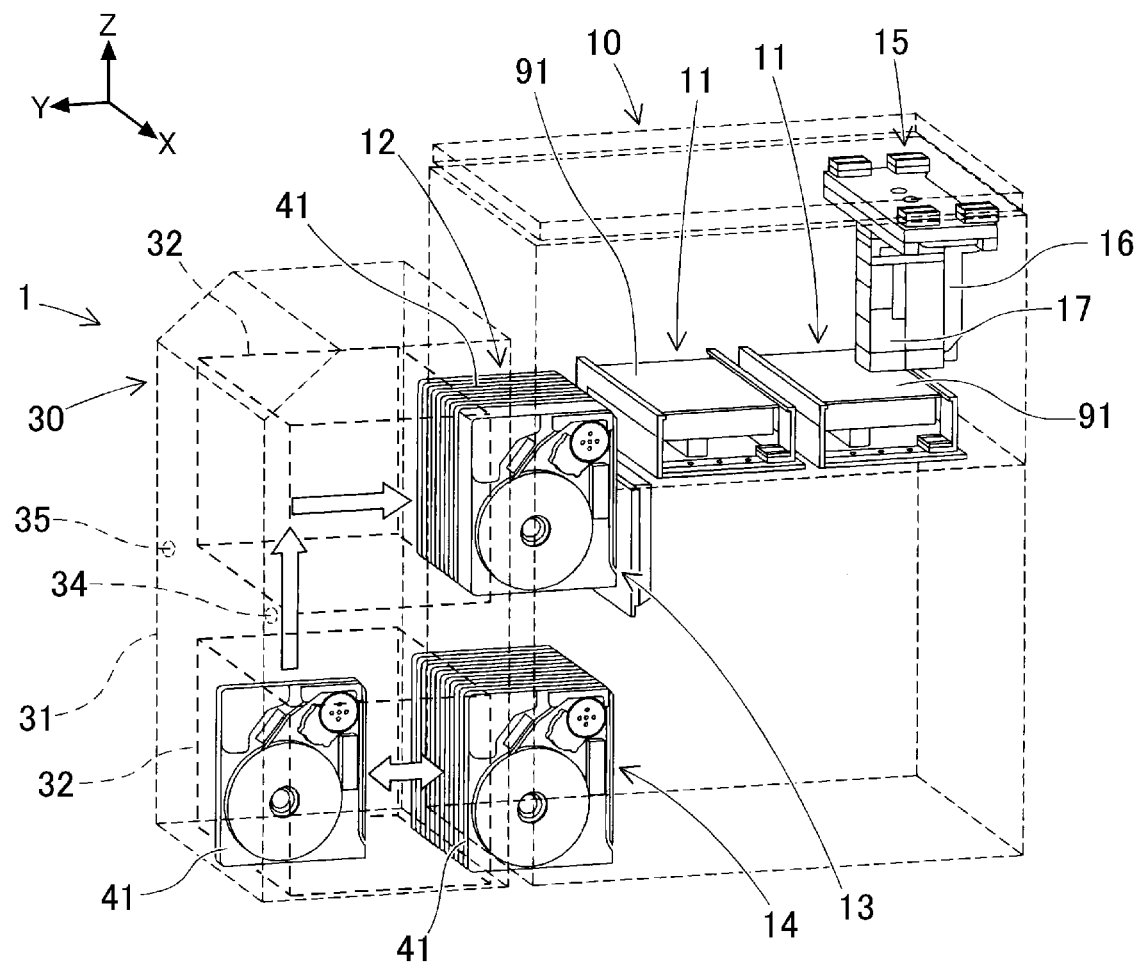
FIG. 3 is a perspective view schematically illustrating a configuration of a loader and a component mounter of FIG. 1.
Figure 4:
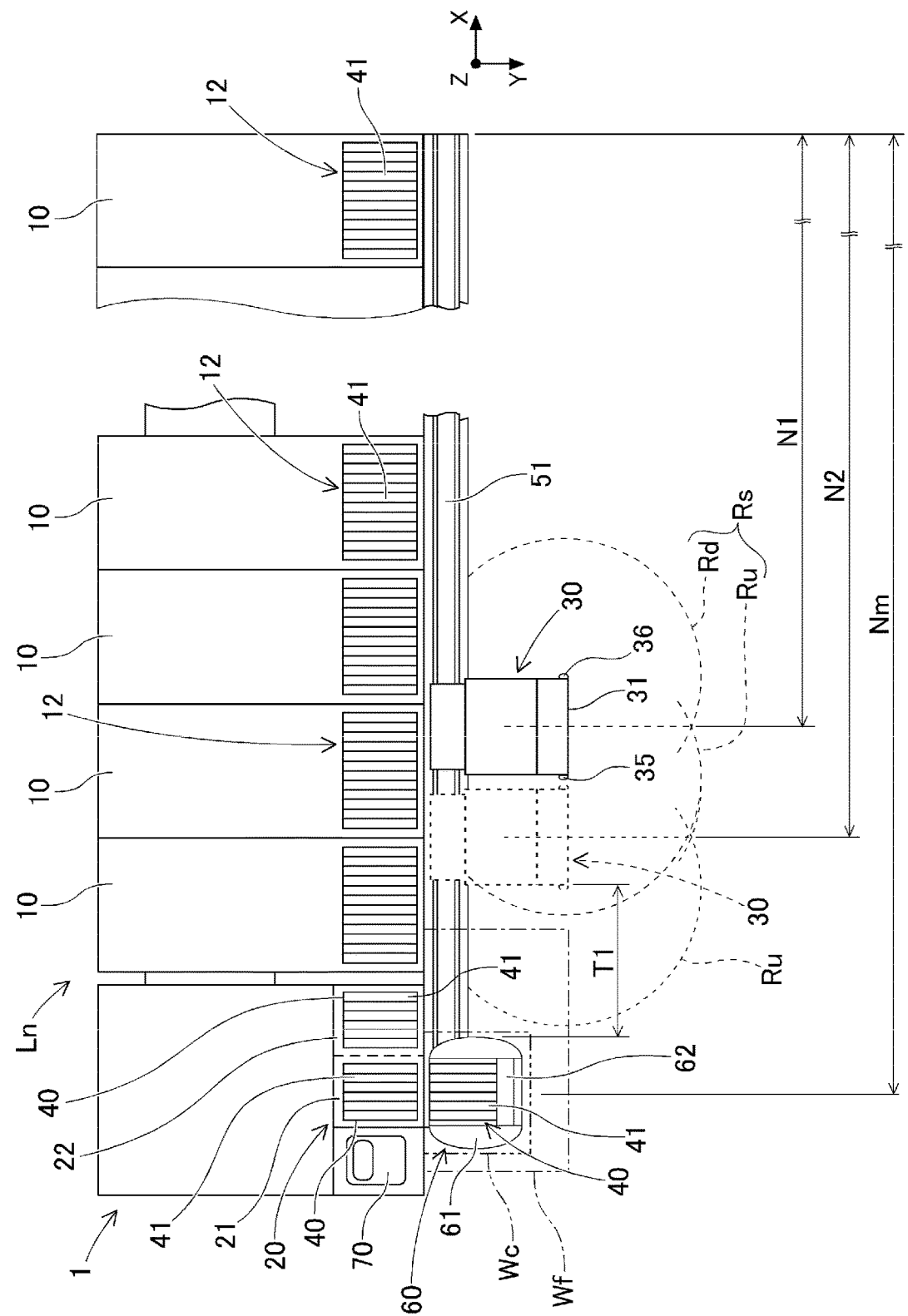
FIG. 4 is a plan view schematically illustrating a configuration and respective ranges of the production system.

Production line Ln includes multiple production devices installed side by side in a conveyance direction of board 91 (refer to FIG. 3). In the present embodiment, as illustrated in FIG. 1 and FIG. 4, multiple production devices include multiple component mounter 10 that mounts components to board 91, and buffer device 20 that holds feeder 41, used by component mounter for supplying the components, in production line Ln. Buffer device 20 is used for storing cassette-type feeder 41.

Buffer device 20 is installed on an upstream side (left side in FIG. 1 and FIG. 4) of multiple component mounters 10 in the conveyance direction of board 91 (left-right direction in FIG. 1 and FIG. 4). In addition, production line Ln may include, for example, a screen printing machine, an inspection machine, and a reflow furnace as a production device. In addition, loader as a work device for performing a predetermined work on each of multiple component mounters and buffer device 20 is applied to production line Ln. The detailed configuration of loader 30 will be described later.

3. Configuration of Component Mounter 10

As illustrated in FIG. 3, multiple component mounters 10 constituting production line Ln include board conveyance device 11, component supply device 12, and head driving device 15. In the following description, it is assumed that a horizontal width direction of component mounter which is the conveyance direction of board 91, is an X-direction, a horizontal depth direction of component mounter 10 is a Y-direction, and a vertical direction (up-down direction of FIG. 3) perpendicular to the X-direction and the Y-direction is a Z-direction.

Board conveyance device 11 includes a belt conveyor, a positioning device, and the like. Board conveyance device 11 subsequently conveys board 91 in the conveyance direction and positions board 91 at a predetermined position in the machine. Board conveyance device 11 conveys board 91 to an outside of component mounter 10 after a mounting process by component mounter 10 is ended.

Component supply device 12 supplies components to be mounted on board 91. Component supply device 12 has upper slot 13 and lower slot 14 that can be equipped with feeder 41. Upper slot 13 is disposed in an upper portion of a front portion side of component mounter 10 and holds equipped feeder 41 in an operational manner. That is, an operation of feeder 41 equipped in upper slot 13 is controlled in the mounting process by component mounter 10 to supply the component in a take-out section provided at a defined position on an upper portion of feeder 41.

Lower slot 14 is disposed below upper slot 13 and stocks equipped feeder 41. That is, lower slot 14 preliminarily holds feeder 41 used for production, or temporarily holds used feeder 41 used for production. The exchange of feeder 41 between upper slot 13 and lower slot 14 is performed by automatic exchange by loader 30 described later or by manual exchange by a worker.

In addition, in a case where feeder 41 is equipped in upper slot 13 or lower slot 14 of component supply device 12, electric power is supplied from component mounter 10 via a connector. Feeder 41 is in a state in which communication with component mounter 10 is possible. Feeder 41 equipped in upper slot 13 controls a feeding operation of a carrier tape accommodating the component based on a control instruction or the like by component mounter 10. As a result, feeder 41 supplies the component in the take-out section provided in the upper portion of feeder 41, so that the component can be picked up by a holding member of mounting head 17 described later.

Head driving device 15 transfers the component supplied by component supply device 12 to a predetermined mounting position on board 91 conveyed into the machine by board conveyance device 11. Head driving device 15 moves moving table 16 in a horizontal direction (X-direction and Y-direction) with a linear motion mechanism. Mounting head 17 is fixed to moving table 16 in an exchangeable manner by a clamp member (not illustrated). Mounting head 17 picks up the component and mounts the component on board 91 by adjusting an up-down direction position and an angle of the component.

Specifically, the holding member for holding the component supplied by feeder 41 is attached to mounting head 17. As the above-described holding member, for example, a suction nozzle that holds a component with supplied negative pressure air or a chuck that grips and holds the component can be applied. Mounting head 17 holds the holding member so as to be movable in the Z-direction and to be rotatable around a θ axis parallel to a Z axis. Mounting head 17 is moved in the XY-directions by the linear motion mechanism of head driving device 15.

Component mounter 10 having the configuration as described above performs the mounting process that mounts the component on board 91. In the mounting process, component mounter 10 transmits a control signal to head driving device 15 based on a result of the image processing, a result detection by various sensors, a control program stored in advance, or the like. As a result, the positions and angles of multiple suction nozzles supported by mounting head 17 are controlled.

The suction nozzle held by mounting head 17 is appropriately changed according to the type of the component mounted to board 91 in the mounting process. In a case where the suction nozzle used in the mounting process to be performed is not held by mounting head 17, component mounter 10 causes mounting head 17 to hold the suction nozzle accommodated in a nozzle station (not illustrated). The above-described nozzle station is detachably equipped in a predetermined position in component mounter 10.

4. Configuration of Buffer Device 20

In the present embodiment, buffer device 20 includes first storage section 21 and second storage section 22. Magazine 40 for feeder 41 is detachably set in first storage section 21 and second storage section 22. Magazine 40 is formed with multiple slots and is configured to hold feeder 41 in each slot. In this manner, buffer device 20 holds feeder 41 by set magazine 40.

First storage section 21 and second storage section 22 are provided side by side in order from the upstream side in the conveyance direction of board 91. In the present embodiment, each of first storage section 21 and second storage section 22 is configured to set one magazine 40. Feeder 41 equipped in magazine 40 set in buffer device 20 is in a state capable of communicating with management device 70 via a control device of buffer device 20. As a result, the slot of buffer device 20 and an identification code (ID) of feeder 41 equipped in the slot are associated with each other and recorded in management device 70.

5. Configuration of Loader 30

Loader 30 is provided to be movable along the conveyance direction of board 91 with respect to multiple production devices (component mounter 10 and buffer device 20). Loader 30 performs a first work on a predetermined production device (component mounter 10 and buffer device 20). The above-described "first work" includes a work of exchanging an exchange element that is detachably equipped in a board work machine such as component mounter 10 with a board work machine. In the present embodiment, as the above-described first work, loader 30 exchanges feeder 41 between multiple component mounters 10 and buffer device 20.

Loader 30 moves along a traveling path including rails 51 (refer to FIG. 1 and FIG. 4) provided at a front portion of multiple component mounters 10 and buffer device 20. Rail 51 extends over substantially the entire area in the conveyance direction of board 91 in production line Ln. Loader 30 is supplied with electric power via rail 51 in a non-contact manner from an opposing production device according to the position of the host device.

Loader 30 has main body 31. Main body 31 is provided to be travelable along the traveling path formed by rail 51. Specifically, main body 31 includes a traveling roller and a guide roller that rollably engage with rail 51. As a result, main body 31 is maintained in its posture, is movable in the X-direction, and is regulated from moving in the Y-direction and the Z-direction. In addition, main body 31 is provided with feeder holding section 32 capable of holding multiple feeders 41. Feeder holding section 32 holds multiple feeders 41 in a state of being aligned in the X-direction.

Loader 30 has loader moving device 33. Loader moving device 33 is driven by electric power supplied from the outside to travel main body 31. In a case where a battery is mounted on main body 31, loader moving device 33 may be driven by electric power supplied from the battery. In addition, loader moving device 33 is combined with rail 51, for example, to constitute a linear motor. At this time, loader moving device 33 generates a propulsive force in the X-direction with respect to rail 51 by supplying power to a moving coil (not illustrated), and moves loader 30 in the X-direction.

Loader 30 has feeder exchanging device 34. Feeder exchanging device 34 exchanges feeder 41 with multiple component mounters 10 constituting production line Ln and with buffer device 20. The exchange of feeder 41 by feeder exchanging device 34 includes at least one of collection and replenishment of feeder 41. In the present embodiment, feeder exchanging device 34 conveys feeder 41 from buffer device 20 to upper slot 13 or lower slot 14 of component mounter 10.

In addition, feeder exchanging device 34 exchanges feeder 41 between upper slot 13 and lower slot 14 of component mounter 10. Furthermore, feeder exchanging device 34 conveys used feeder 41 from component mounter 10 to buffer device 20. Feeder exchanging device 34 is configured to move feeder 41 with respect to main body 31 in an attachment/detachment direction (Y-direction in the present embodiment) and the up-down direction (Z-direction) of feeder 41.

Loader 30 has first sensor 35 and second sensor 36. First sensor 35 and second sensor 36 detect the presence of an intruding object (including a worker) in detection range Rs around loader 30, and transmit a signal based on the detection to loader control device 37. First sensor 35 and second sensor 36 detect the intruding object using infrared rays, ultrasonic waves, or the like.

As illustrated in FIG. 4, first sensor 35 is provided on a first side of main body 31 (upstream side in the conveyance direction of board 91) in the Y-direction, and detects the presence of the intruding object in upstream side range Ru that is a part of detection range Rs. Second sensor 36 is provided on a second side of main body 31 (downstream side in the conveyance direction of board 91) in the Y-direction, and detects the presence of the intruding object in downstream side range Rd that is a part of detection range Rs.

Loader 30 has loader control device 37. Loader control device 37 is a controller mainly including CPU, various memories, and a control circuit. Loader control device 37 is communicably connected to multiple component mounters 10, buffer device 20, and management device 70. Loader control device 37 controls the operations of loader moving device 33, feeder exchanging device 34, and the like.

Detecting section 38 is incorporated in loader control device 37. In the present embodiment, detecting section 38 detects the intruding object that has entered detection range Rs around loader 30 based on the signal transmitted by first sensor 35 and second sensor 36. By using the signals of first sensor 35 and second sensor 36, detecting section 38 can recognize whether the detected intruding object is present on the upstream side or on the downstream side in the conveyance direction of board 91. In addition, detecting section 38 may recognize a distance between loader 30 and the intruding object based on a strength of the signal or the like.

In a case where the intruding object is detected by detecting section 38, loader control device 37 promptly stops loader 30 if it is traveling. In addition, loader control device 37 maintains the stopped state of loader 30 during a period in which the intruding object is detected by detecting section 38. At this time, as in the present embodiment, in a case where it is possible to recognize whether the intruding object is present on the upstream side or on the downstream side in the conveyance direction of board 91, loader 30 may be moved to a side opposite to the intruding object.

In addition, loader control device 37 detects a current position of main body 31 on the traveling path based on a detection signal by a position detecting sensor (not illustrated). Specifically, the above-described position detecting sensor is disposed to face a linear scale provided on rail 51, for example, and detects a scale of the linear scale. In addition, an optical detection method or a detection method using electromagnetic induction can be applied to the position detection sensor for detecting the position of main body 31.

As in the above-described configuration, loader 30 is configured to move along rail 51 to a predetermined position and to exchange feeder 41 in the stopped position. Here, movable range Nm of loader 30 is set to a range that substantially coincides with the entire length of rail 51 and contacts stoppers at both ends in a moving direction, for example. Movable range Nm of loader 30 may be appropriately set to avoid interference between loader 30 and other members provided in production line Ln, or to a necessary maximum range according to the application.

In addition, loader control device 37 conforms to an instruction by upper management device 70 with respect to the operation processing in a case where the intruding object is detected and the movement limit in movable range Nm. In addition to the case where the instruction of management device 70 is transmitted according to the operation status of loader 30 or the like, loader 30 may store contents which are set in advance when the operation starts for the operation processing corresponding to the presence or absence of the intruding object, for example. In addition, loader control device 37 subsequently performs the first work requested from the outside, and notifies management device 70 of the current work position of the first work being performed and the degree of progress of the work content. As a result, management device 70 updates first work information M1 including the information.

6. Configuration of Management Device 70

Figure 2:
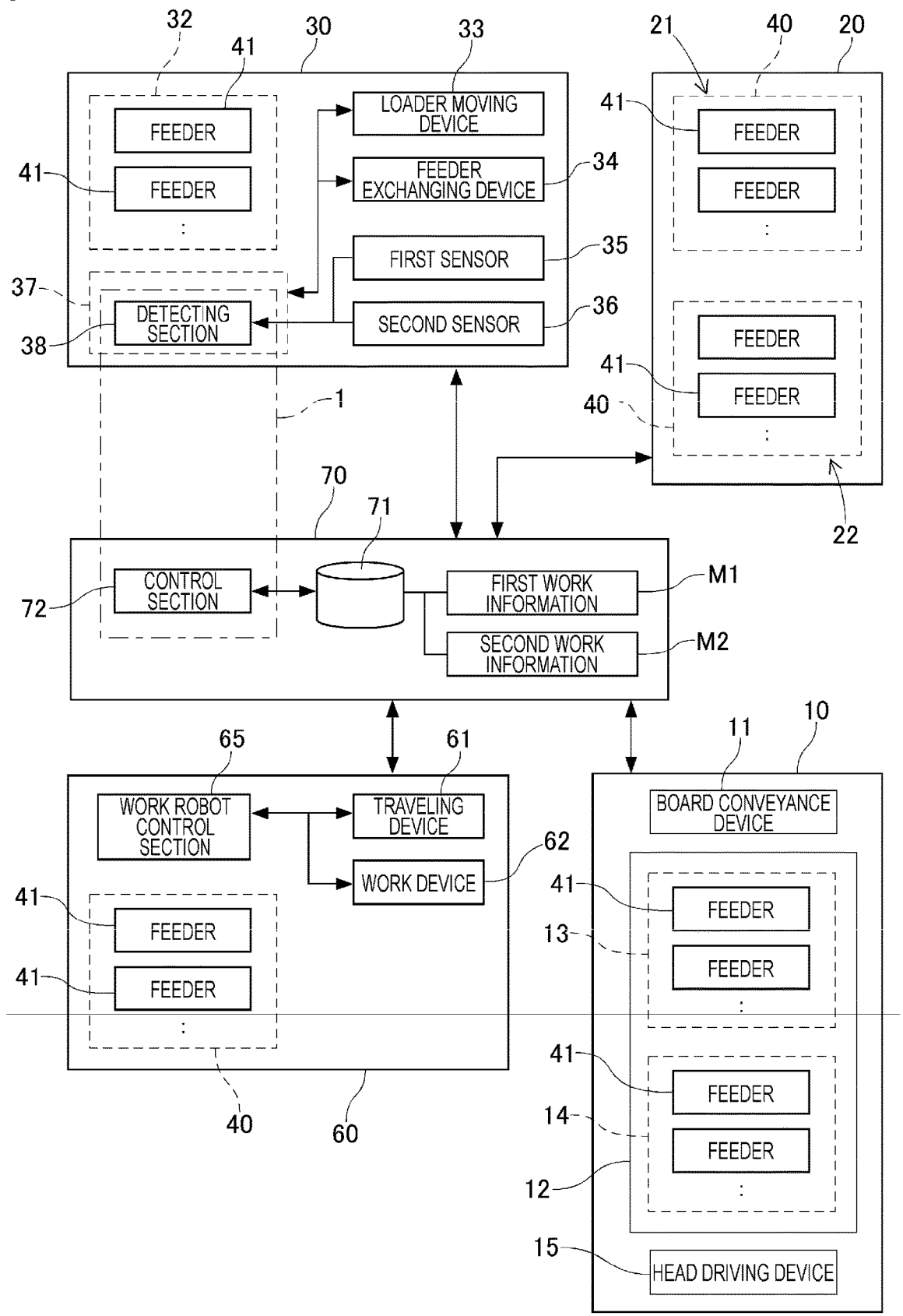
FIG. 2 is a block diagram illustrating a function of the production system of FIG. 1.

Management device 70 monitors the operation status of production line Ln and performs control of the production device including component mounter 10, buffer device 20, and loader 30. As illustrated in FIG. 2, management device 70 includes memory section 71. In memory section 71, various data for controlling each of multiple production devices is stored. Management device 70 appropriately transmits instructions according to various data and the status when performing the mounting process by component mounter 10, the management of feeder 41 by buffer device 20 and an exchange process by loader 30.

Management device 70 has control section 72. In a case where self-propelled work robot 60 enters movable range Nm of loader 30 in production line Ln to perform a predetermined work (hereinafter, referred to as "second work"), control section 72 controls the operations of loader 30 and work robot 60 in order to prevent the interference between loader 30 and work robot 60. The above-described work robot 60 performs the second work on any one of multiple production devices (component mounter 10 and buffer device 20) constituting production line Ln as a target.

The above-described second work includes a work of exchanging feeder 41 with component mounter 10 or with buffer device 20. Furthermore, the second work includes a work of exchanging magazine 40 equipped with multiple feeders 41 with buffer device 20 or with component mounter 10. In the following description, it is assumed that the second work by work robot 60 is a work of replenishing magazine 40 to first storage section 21 or second storage section 22 of buffer device 20 and of collecting magazine 40 from first storage section 21 or second storage section 22.

Work robot 60 performing the second work as described above conveys, for example, magazine 40, feeder 41, and a reel around which a carrier tape is wound between a storage warehouse (not illustrated) for storing buffer device 20 and large number of feeders 41 and a work table (not illustrated) for loading the carrier tape into feeder 41. Work robot 60 includes multiple types according to the contents of the second work to be performed as described above and the conveyance target. In addition, in production system 1, multiple work robots 60 may be applied to perform each work in parallel.

Control section 72 limits the movement of loader 30 to first range N1 set in advance when the second work is performed by work robot 60. In the present embodiment, first range N1 described above is set in advance for each work position or work content of the second work such that work robot 60 during performing the second work is always outside detection range Rs. Specifically, in a case where the work content of the second work is the exchange of magazine for buffer device 20, as illustrated in FIG. 4, first, fixed work area Wf is assigned to work robot 60.

Fixed work area Wf is an area fixed with respect to the work content of the second work regardless of the type and detailed work position of work robot 60 (for example, a position where a target is first storage section 21 or a position where a target is second storage section 22). In addition, in the fixed work area Wf, for example, in a case where work robot 60 exchanges feeder 41 with predetermined component mounter 10, the position and the size are set in advance according to the position of component mounter 10. In other words, fixed work area Wf is an area where work robot 60 does not exit outside during performing the second work.

First range N1 is set such that detection range Rs of loader 30 does not overlap with above-described fixed work area Wf. For example, first range N1 is set to a range in which movable range Nm is narrowed so that a position separated from the position of loader 30 by the safety margin when fixed work area Wf and detection range Rs are in contact is set to one end. Loader 30 is limited to movement inside first range N1 based on an instruction from control section 72 of upper management device 70 at least during a period in which work robot 60 performs the second work.

That is, loader 30 subsequently performs the first work requested to be performed that can be performed by the movement inside first range N1. Under such a limit, depending on the time required for the second work by work robot 60, all first works that loader 30 can perform may be ended. In such a case, in practice, although the first work that can be performed without the interference of loader 30 with work robot 60 outside first range N1 is present, there is a state in which the first work cannot be performed because of the above-described movement limit.

This is because fixed work area Wf is widely set to a necessary and sufficient size for reasons of circumstances such as enabling fixed work area Wf to be coped with various work robots 60. Therefore, control section 72 adopts a configuration for improving the efficiency of loader 30 by appropriately changing the range for limiting the movement of loader 30. Specifically, in a case where the first work which can be performed by the movement of loader 30 in first range N1 has ended during performing the second work by work robot 60, control section 72 limits the movement of loader 30 to second range N2, which is set to be wider than first range N1.

Various aspects may be adopted for setting above-described second range N2. In a first aspect of the range setting, second range N2 is set such that distance T1 between a portion of loader 30 and a portion of work robot 60 which are closest to each other when loader 30 moves toward work robot 60 during performing the second work is equal to or larger than a predetermined value. That is, while first range N1 is set by using the positional relationship between fixed work area Wf and detection range Rs, in the first aspect of the range setting, first range N1 is set to an extended range such that one end is a position separated by a safety margin from the position of loader 30 that has approached until it contacts work robot 60.

In a second aspect of the range setting, second range N2 is set based on second work information M2 including at least one of the current work position of the second work being performed by work robot 60, the degree of progress of the work content, and the type of work robot 60. Furthermore, second range N2 may be dynamically updated based on second work information M2 updated in accordance with the progress of the second work during performing the second work by work robot 60.

That is, while first range N1 is set by using fixed work area Wf, in the second aspect of the range setting, first range N1 is set based on current work area Wc assigned according to the current state of current work robot 60. Current work area Wc is assigned based on the type of work robot 60 and a detailed work position (for example, a position where a target is first storage section 21 or a position where a target is second storage section 22), and has a range narrower than fixed work area Wf. As a result, second range N2 is set to allow further movement to work robot 60 side by at least a difference between fixed work area Wf and current work area Wc.

Second range N2 may be set according to the other aspects described above. For example, second range N2 may be set by simply reducing the above-described safety margin or fixed work area Wf used in setting first range N1. In any aspect, each range is wide in the order of first range N1, second range N2, and movable range Nm, and in the inside thereof, the movement of loader 30 is allowed.

Control section 72 described above allows the movement of loader 30 in movable range Nm of loader 30, which is wider than first range N1, in a case where the intruding object is not detected by detecting section 38 of loader 30, and limits the movement of loader 30 in a case where the intruding object is detected by detecting section 38. In addition, control section 72 stops loader 30 in a case where the intruding object is detected by detecting section 38, and maintains the stopped state of loader 30 during a period in which the intruding object is detected by detecting section 38, or allows only the movement of loader 30 to a side opposite to the intruding object.

Here, control section 72 may limit the movement of loader 30 to first range N1 or second range N2 as described above. At this time, in a case where buffer device 20 is not included in first range N1, that is, when the movement is inside first range N1, the first work for buffer device 20 may not be performed. In such a case, control section 72 causes loader 30 to perform preliminary collection in which feeder 41 scheduled to be collected from component mounter 10 to buffer device 20 is held by one of multiple component mounters 10 that is close to buffer device 20, as the first work.

Specifically, although control section 72 is requested to collect feeder 41 from a target machine, which is one of multiple component mounters 10 included in first range N1, and move feeder 41 to buffer device 20, control section 72 cannot perform the first work unless buffer device 20 is included in first range N1. Therefore, if there is an empty slot in upper slot 13 or lower slot 14 of component mounter 10 included in first range N1 and on the upstream side of the target machine, the control section 72 causes the empty slot to hold feeder 41 collected from the target machine.

Loader 30 then moves feeder 41 to buffer device 20 after the movement limit is canceled later. At this time, since a movement distance of loader 30 is shorter than a moving distance from the target machine to buffer device 20, the time required for the collecting work is shortened. In addition, in a case where there are multiple empty slots in component mounter 10 on the upstream side of the target machine, empty slots that are the same as or close to component mounter 10, which is a target of the first work scheduled to be performed, for example, may be preferentially selected. As a result, it is possible to collect feeder 41 or the like in a series with the first work scheduled to be performed, so that the work efficiency of loader 30 can be improved.

7. Configuration of Work Robot 60

Work robot 60 is configured to travel on a floor of a production facility in which production line Ln is installed. Work robot 60 is used for conveying articles such as magazine 40 and feeder 41 in cooperation with buffer device 20, the storage warehouse of feeder 41, the work table for setup, and the worker. Work robot 60 has traveling device 61 that travels on a floor while recognizing the position of the host device. Traveling device 61 is provided with work device 62 that performs a predetermined work such as delivering an article to or from a predetermined target.

In addition, work robot 60 has robot control device 63 communicably connected to external management device 70 and configured to control the operations of traveling device 61 and work device 62. Work robot 60 configured as described above subsequently performs the second work requested from the outside. At this time, work robot 60 notifies management device 70 that manages target production line Ln of work advance notice indicating that the second work is to be performed, and starts the second work after receiving permission from management device 70.

In addition, work robot 60 notifies management device 70 of the current work position and the degree of progress of the work content during performing the second work. As a result, management device 70 updates second work information M2 including the information. In the present embodiment, as the second work, work robot 60 exchanges a magazine capable of holding multiple feeders 41 with buffer device 20 or component mounter 10.

8. Processing for Limiting Movement of Loader 30 by Production System 1

Figure 5:
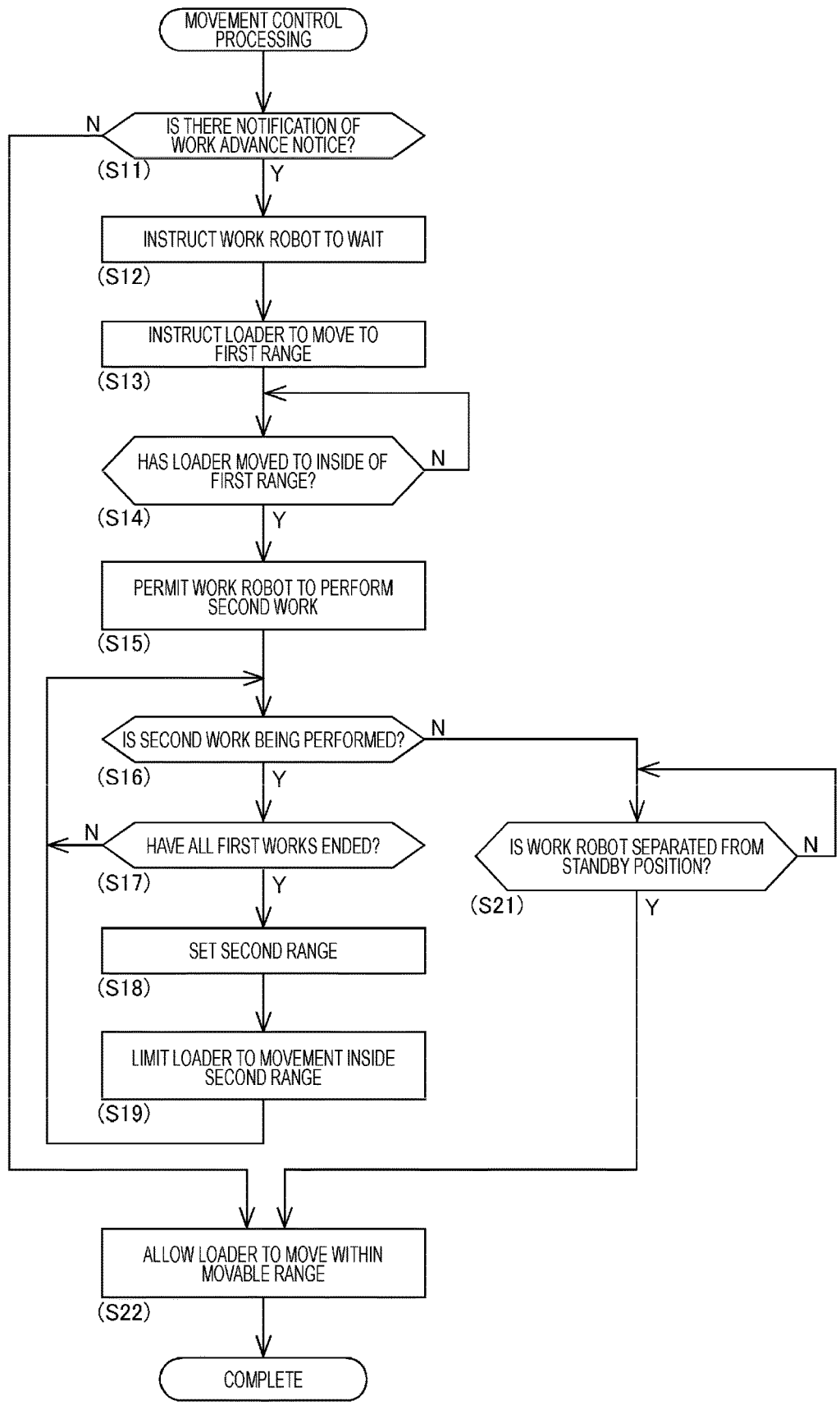
FIG. 5 is a flowchart illustrating movement control processing of the loader.

Processing for limiting the movement of loader 30 by production system 1 will be described with reference to FIG. 5. Production system 1 includes control section 72 incorporated in loader 30 and management device 70, and further includes detecting section 38 incorporated in loader 30 in the present embodiment. Control section 72 monitors whether there is a notification of a work advance notice for performing the second work from work robot 60 (S11). In a case where there is no notification of the work advance notice (S11: No), control section 72 allows loader 30 to move within movable range Nm (S22).

In a case where there is a notification of the work advance notice from work robot 60 (S11: Yes), control section 72 instructs work robot 60 to wait at a predetermined standby position (S12). The above-described standby position is set at a position where work robot 60 is outside detection range Rs of loader 30 even though loader 30 is present at any position of movable range Nm in production line Ln. Control section 72 instructs loader 30 to move to the inside of first range N1 set in advance (S13). As a result, the movement of loader 30 is limited to the inside of first range N1 until a cancellation instruction is issued.

Control section 72 monitors a current position of loader 30 based on a notification from loader control device 37 (S14). In a case where loader 30 has not moved to the inside of first range N1 (S14: No), control section 72 causes work robot 60 to maintain the standby state. In addition, in a case where loader 30 has moved to the inside of first range N1 (S14: Yes), control section 72 permits work robot 60 to perform the second work (S15).

Subsequently, control section 72 monitors whether the second work by work robot 60 is being performed based on updated second work information M2 (S16). In a case where the second work is being performed (S16: Yes), control section 72 monitors whether all first works that can be performed inside first range N1 by loader 30 have ended (S17). In a case where all first works have not ended (S17: No), control section 72 continues the above-described monitoring (S16, S17).

Here, in a case where the second work is being performed (S16: Yes) and all first works have ended (S17: Yes), control section 72 sets second range N2 (S18). Second range N2 is set by a method selected from various aspects as described above. For example, control section 72 may acquire an external dimension of work robot 60 based on the type of work robot that has notified the work advance notice, and further set second range N2 in which work robot falls during performing the second work based on the work position.

In addition, for example, it is assumed that the second work by work robot 60 replenishes magazine 40 to second storage section 22 of buffer device 20 and collects magazine from first storage section 21. In such a case, during performing the second work, work robot moves to the upstream side from the position facing second storage section 22 to the position facing first storage section 21. Therefore, control section 72 can dynamically set second range N2 by recognizing the degree of progress of the second work and the like based on second work information M2.

After setting and updating second range N2 as described above, control section 72 limits loader 30 to movement inside second range N2 (S19). In other words, control section 72 relaxes the limit by extending the range from first range N1 to second range N2, and allows loader to move inside second range N2.

Subsequently, in a case where the performing of the second work by work robot 60 has ended (S16: No), control section 72 monitors whether work robot 60 has been separated from production line Ln from the above-described standby position (S21). In a case where work robot 60 is closer to production line Ln than the standby position (S21: No), control section 72 maintains a state in which the movement of loader 30 is limited to second range N2. In a case where work robot 60 has been separated from production line Ln from the standby position (S21: Yes), control section 72 allows the movement of loader 30 in movable range Nm to cancel the movement limit of loader 30 (S22).

With the configuration described above, in a case where self-propelled work robot 60 performs the second work in movable range Nm of loader 30, the range for limiting the movement of loader 30 is changed in a stepwise manner (S13, S19). Accordingly, a range within which loader 30 can work is extended in movable range Nm of loader 30, so that the efficiency of loader 30 is improved. As a result, productivity in production line Ln can be improved.

9. Modification Aspect of Embodiment

In the embodiment, the second work by work robot 60 is exemplified as exchanging magazine 40 or feeder 41 with buffer device 20. Alternatively, the second work by work robot 60 may be to replenish or collect articles with predetermined component mounter 10. In such a case, first range N1 and second range N2 are set on the upstream side or the downstream side of the work position of work robot 60. Control section 72 may set first range N1 and second range N2 based on the contents of the first work scheduled to be performed by loader 30 and the work position of work robot 60.

In addition, it is assumed that the exchange element, which is an exchange target of loader 30 and work robot 60, is magazine 40 or feeder 41 as described above. Alternatively, loader 30 and work robot 60 may use anything other than feeder 41 as the exchange element. Specifically, for example, a tape reel, a nozzle station, or a waste tape collecting container which are equipped to component mounter 10 in an exchangeable manner, can be the exchange elements.

There is a type of feeder in which a reel holder that holds the tape reel is disposed outside. Loader 30 automatically exchanges the tape reel of the feeder, thereby enabling accurate delivery of the tape reel. In addition, the nozzle station is required to hold the suction nozzles corresponding to the types of components used in the production of the board product. Therefore, the production efficiency in production line Ln can be improved by disposing a storage device for the nozzle station in production line Ln and enabling the nozzle station to be automatically exchanged between the storage device and component mounter 10.

In addition, the waste tape collecting container described above is a container, for example, that is equipped below upper slot 13 of component mounter 10 and that collects waste tape generated when each of feeders 41 supplies the components. This waste tape is, for example, a portion of a carrier tape from which the component has been taken out and cut to an appropriate length. The capacity of the waste tape collecting container is limited. Therefore, from a viewpoint of maintaining a good production state, using loader 30 to maintain, for example, the amount of waste tapes collected by the waste tape collecting container equal to or less than a certain amount is useful.

In addition, loader 30 may be configured to supply the stick and collect the empty stick in a case where feeder 41 is a stick feeder. In addition, in a case where feeder 41 is a bulk feeder, loader 30 may be configured to supply the bulk component or to supply a component case accommodating the bulk component and to collect the empty component case. Even in such a configuration, it is possible to automatically replenish and collect the exchange element, and it is possible to improve the production efficiency in production line Ln.

REFERENCE SIGNS LIST

1: production system, Ln: production line, 10: component mounter (production device), 20: buffer device (production device), 30: loader, 35: first sensor, 36: second sensor, 38: detecting section, 40: magazine, 41: feeder, 60: work robot, 70: management device, 71: memory section, 72: control section, M1: first work information, M2: second work information, 91: board, Rs: detection range, Nm: movable range, N1: first range, N2: second range

The invention claimed is:

1. A production system comprising:
a loader provided to be movable along a conveyance direction of a board with respect to multiple production devices constituting a production line of a board product, and configured to perform a first work with respect to a predetermined production device; and
a control section configured to limit movement of the loader to a first range set in advance when performing a second work on the predetermined production device by a self-propelled work robot, and configured to limit the movement of the loader to a second range set wider than the first range in a case where the first work which can be performed by the movement of the loader in the first range has ended during performing the second work by the work robot.

2. The production system according to claim 1, further comprising:
a detecting section configured to detect an intruding object that has entered a detection range around the loader.

3. The production system according to claim 2,
wherein the control section allows the movement of the loader in a movable range of the loader that is wider than the first range in a case where the intruding object is not detected by the detecting section, and limits the movement of the loader in a case where the intruding object is detected.

4. The production system according to claim 2,
wherein the first range is set in advance for each work position or work content of the second work such that the work robot is always outside the detection range during performing the second work.

5. The production system according to claim 2,
wherein the control section stops the loader in a case where the intruding object is detected by the detecting section, and maintains a stopped state of the loader during a period in which the intruding object is detected by the detecting section, or allows only the movement of the loader to a side opposite to the intruding object.

6. The production system according to claim 1,
wherein the second range is set such that a distance between a portion of the loader and a portion of the work robot which are closest to each other when the loader moves toward the work robot during performing the second work is equal to or larger than a predetermined value.

7. The production system according to claim 1,
wherein the second range is set based on second work information including at least one of a current work position of the second work being performed by the work robot, a degree of progress of a work content of the second work, and a type of the work robot.

8. The production system according to claim 7, wherein the second range is dynamically updated based on the second work information which is updated in accordance with the progress of the second work during performing the second work by the work robot.

9. The production system according to claim 1, wherein the multiple production devices include multiple component mounters for mounting a component on the board and a buffer device for holding a feeder, which is used by the component mounter to supply the component, in the production line, and
the loader exchanges the feeder between the multiple component mounters and the buffer device as the first work.

10. The production system according to claim 9, wherein the control section limits the movement of the loader to the first range or the second range, and in a case where the buffer device is not included in the first range, the control section causes the loader to perform preliminary collection in which the feeder scheduled to be collected from the component mounter to the buffer device is held by one of the multiple component mounters that is close to the buffer device, as the first work.

11. The production system according to claim 9, wherein the work robot exchanges a magazine that can hold multiple feeders with the buffer device or the component mounter, as the second work.

* * * * *